United States Patent [19]

Leonard

[11] 4,249,951
[45] Feb. 10, 1981

[54] PROCESS FOR UTILIZING MINERAL-CONTAINING RESIDUE FROM COAL LIQUEFACTION PROCESSES

[75] Inventor: Robert E. Leonard, Oklahoma City, Okla.

[73] Assignee: Kerr-McGee Corporation, Oklahoma City, Okla.

[21] Appl. No.: 73,469

[22] Filed: Sep. 7, 1979

[51] Int. Cl.³ .............................................. C04B 7/36
[52] U.S. Cl. ..................................................... 106/103
[58] Field of Search ......................................... 106/103

[56] References Cited

U.S. PATENT DOCUMENTS 4,022,629   5/1977   Garrett et al. ........................ 106/103

Primary Examiner—James Poer
Attorney, Agent, or Firm—William G. Addison

[57] ABSTRACT

A process for utilizing mineral-containing residue from coal liquefaction processes to produce a hydraulic cement. The residue is mixed with siliceous and calcareous materials and compacted. The compacted solids are introduced into a kiln and fired to produce hydraulic cement clinker. The primary fuel for the clinker production is contained in the residue. The clinker is removed from the kiln and ground to produce cement.

7 Claims, No Drawings

PROCESS FOR UTILIZING MINERAL-CONTAINING RESIDUE FROM COAL LIQUEFACTION PROCESSES

BACKGROUND OF THE INVENTION

1. Field of the Invention

The present invention relates to a process for converting the mineral-containing residue resulting from coal liquefaction processes into hydraulic cement.

2. Brief Description of the Prior Art

Processes which convert coal or other carbonaceous materials to liquid products or to low mineral content meltable solids also produce large quantities of mineral-containing residue. One particular coal conversion process employs hydro-liquefaction of coal to produce both liquid and meltable solid products. The hydro-liquefaction process also produces a mineral-containing residue comprising from about 35 to 60 percent mineral matter with the balance being substantially high molecular weight aromatic compounds and carbon. The mineral matter includes kaolinite, calcite, gypsum, pyrrhotite and the like.

Presently, it is anticipated that the residue resulting from coal liquefaction processes will be employed as feed, either alone or in admixture with untreated coal, to gasifiers wherein hydrogen is produced. The hydrogen will be used in the liquefaction processes to improve the quality of the products. Generally, gasifiers are designed to handle feeds containing less than 35 percent mineral matter. When the residue from a hydro-liquefaction process containing in excess of 35 percent mineral matter is introduced into a gasifier certain problems arise. The gasifier can not be operated to produce the maximum quantities of hydrogen possible from the feed if mechanical operating problems are to be avoided. Thus, some valuable carbonaceous material is lost. The gasifier also produces a mineral ash which then must be disposed of in an ecologically acceptable manner.

It would be desirable to provide a process whereby the energy value of the mineral-containing residue from coal liquefaction processes can be recovered and the mineral content of the residue can be constructively and profitably utilized.

SUMMARY OF THE INVENTION

The discovery now has been made that mineral-containing residue resulting from coal liquefaction processes can be converted in a novel and economical manner into a hydraulic cement having the properties of portland cement.

According to the present invention there is provided a process for the utilization of mineral-containing residue from coal liquefaction processes, which comprises the following steps:

(a) forming an admixture consisting of mineral-containing residue from coal liquefaction with siliceous material and calcareous material in a predetermined ratio;

(b) compacting said mixture (without the addition of a separate binding agent or agents) to form aggregates of a desired size;

(c) introducing said compacted material or aggregates into a kiln wherein the aggregates are fired at a temperature sufficient to convert the same into a cement clinker and (d) comminuting the clinker to provide a product comprising a hydraulic cement. In use, a retarding agent, such as gypsum, can be added to the cement so produced to control its premature setting.

DESCRIPTION OF THE PREFERRED EMBODIMENT

Large quantities of mineral-containing residue are produced as a by-product of coal liquefaction processes. The present invention provides a simple and economical method for recovering the thermal energy value from the carbonaceous material present in the residue and also for converting the mineral content of the residue to a useful product.

The residue results from the treatment of coal or other carbonaceous material with a liquefaction solvent in a reactor maintained at an elevated temperature and pressure. The liquefaction operation can be effected with or without the introduction of hydrogen gas into the reactor. The products of the liquefaction operation can be liquids or meltable solids. The products of the liquefaction process can be separated from the mineral-containing residue by filtration, centrifugation gravity settling or the like.

In one particular process, the reactor effluent is admixed with a deashing solvent and introduced into a separation zone, such as disclosed in copending application Ser. No. 973,876 entitled "A System For Producing A Powdery Composition Comprising Coal Products In A Coal Deashing Process," filed Dec. 28, 1978 and assigned to the same assignee as the present invention. The disclosure of said copending application specifically is incorporated herein by reference.

In the invention disclosed in said copending application, the separation zone is maintained at an elevated temperature and pressure to effect a separation of the mineral-containing residue from the valuable liquefaction products. More particularly, the temperature is maintained in a range of from about 400 degrees F. to about 700 degrees F. The pressure level is maintained in a range of from about the critical pressure of the deashing solvent to about 1000 psig.

The mixture separates into a light fraction comprising the liquefaction products and deashing solvent and a heavy fraction comprising the mineral-containing residue and some deashing solvent. The light fraction is withdrawn from the separation zone for further processing and recovery. The heavy fraction is withdrawn from the separation zone and the pressure level thereon is reduced at least about 100 psig. to vaporize the deashing solvent and yield a composition of matter comprising the mineral-containing residue in a relatively dry, powder-like form.

The mineral-containing residue differs substantially from raw coal or materials such as fly ash produced by the combustion of coal. A more complete understanding of the chemical nature of the mineral-containing residue can be had by reference to a method of chemical fractionation utilizing highly selective solvents described by D. D. Whitehurst et al in "The Nature And Origin Of Asphaltenes In Processed Coals", one of a series of yearly reports by Mobil Research and Development Corp. to the Electric Power Research Institute which was published in February, 1976, (Government Doc. No. PB 257569), the disclosure of which is incorporated herein by reference. The results of several analyses of exemplary mineral-containing residues are set forth in Table I, below:

TABLE I

| Fraction No. | Chemical Classes of Fractions | Sample No. 1[1] | 2[2] | 3[3] | 4[4] |
|---|---|---|---|---|---|
| 1 | saturates | 0.2 | — | 0.1 | — |
| 2 | aromatics | 0.4 | 0.3 | 0.8 | — |
| 3 | polar aromatics | 0.6 | 1.3 | 1.8 | — |
| 4 | simple phenols | 0.8 | 1.6 | 2.0 | — |
| 5 | basic $N_2$ heterogeneous | 0.8 | 1.5 | 0.8 | — |
| 6 | highly functional heterogeneous | 1.9 | 1.8 | 1.5 | — |
| 7 | poly phenols | 1.5 | 3.3 | 1.2 | — |
| 8 | heterocyclics | 0.8 | 6.9 | 1.4 | — |
| 9 | increased heterocyclics | 5.6 | 16.4 | 10.4 | — |
| 10 | non-eluted ash free materials | 76.1 | 30.7 | 37.9 | — |
| 11 | non-eluted ash | 11.3 | 36.2 | 42.1 | 100.0 |

[1]Moisture free Kentucky 9 & 14 coal.
[2]Mineral-containing residue of the present invention.
[3]Mineral-containing residue of the present invention.
[4]Fly ash from combustion of coal.

In accordance with the present invention, the mineral-containing residue is admixed with siliceous material and calcareous material in a predetermined ratio. Advantageously, the siliceous material is in the form of ordinary sand, crushed shale or the like and the calcareous material may comprise limestone or sea shells that have been crushed and ground to form fine particles, quick lime or the like. The mineral-containing residue is admixed with the siliceous and calcareous materials and any other minor additives that may be desired in a ratio such that the mineral content of the cement clinker (being formed) will correspond to whatever type of portland cement is desired.

The mixture then is introduced into a kiln and fired to produce a cement clinker. Advantageously, the mixture first is compacted to form aggregates of any desirable size to facilitate introduction into the kiln and avoid dusting problems. The aggregates are formed by compacting the mixture of mineral-containing residue and siliceous and calcareous materials at an elevated pressure. No additional binding agent is required to form the aggregates. The unique composition of the mineral-containing residue includes a sufficient quantity of high molecular weight compounds to adequately bind the mixture together into aggregates upon compaction.

While the specific mechanism is not fully understood, it is believed that the compounds representing fraction 9 in Table I, above, contribute to the mineral-containing residue's ability to bind the siliceous and calcareous materials into non-disintegrating aggregates. The mineral-containing residue contains nearly twice as much or more of the fraction 9 compounds as raw coal.

The compacted aggregates then are introduced into the kiln for firing to produce the cement clinker. The compacted aggregates are ignited and the kiln is permitted to heat to a temperature in the range of from about 2600 degrees F. to 2750 degrees F. The compacted aggregates are retained within the kiln for a sufficient time to effect the conversion of the mixture into a composition corresponding to a desired type of portland cement.

Generally, five types of portland cement are recognized in the United States. These are designated by the American Society for Testing and Materials in ASTM Specification C 150-63 as follows:

Type I. For use in general concrete construction when the special properties of types II, III, IV and V are not required.

Type II. For use in general concrete construction exposed to moderate sulfate action or where moderate heat of hydration is required.

Type III. For use when high early strength is required.

Type IV. For use when low heat of hydration is required.

Type V. For use when high sulfate resistance is required. Another type of cement is white portland cement in which the iron oxide is so reduced in concentration and the manufacture so controlled that the product is nearly white. The potential compound composition of the various portland cements as calculated by ASTM C 150-73 is set forth in Table II, below:

TABLE II

| Portland Cement | Potential Compound Composition | | | |
|---|---|---|---|---|
| | $C_3S$[1], % | $C_2S$[2], % | $C_3A$[3], % | $C_4AF$[4], % |
| Type I | 55 | 19 | 10 | 7 |
| Type II | 51 | 24 | 6 | 11 |
| Type III | 56 | 19 | 10 | 7 |
| Type IV | 28 | 49 | 4 | 12 |
| Type V | 38 | 43 | 4 | 9 |
| White | 33 | 46 | 14 | 2 |

[1]Tricalcium silicate (3CaO . $SiO_2$)
[2]Dicalcium silcate (2CaO . $SiO_2$)
[3]Tricalcium aluminate (3CaO . $Al_2O_3$)
[4]Tetracalcium aluminoferrite (4CaO . $Al_2O_3$ . $Fe_2O_3$)

The mineral-containing residue of the present invention can be admixed with siliceous and calcareous materials, alumina, iron oxide and other materials to provide a composition equivalent to any desired type of portland cement. The mineral-containing residue normally contains sufficient clay that no additional argillaceous material is required.

The unique composition of the mineral-containing residue itself provides substantially all of the fuel necessary to convert aggregates of the same with other materials into hydraulic cement. This permits a more economical production of cement than is possible by rotary kilns or shaft kilns heated solely by burning fuel oil, natural gas or coal. In some instances it may be necessary to supplement the fuel supplied by the mineral-containing residue. The supplemental fuel can comprise oil, natural gas, coal, or the like.

In one preferred embodiment, the kiln comprises a vertical shaft furnace. The furnace can be operated as a batch unit or in a continuous operation by controlling the rate of addition of feed to the top of the kiln and the removal of clinker through a bottom grate. Surprisingly, the aggregates of the present invention have been found to retain their shape during firing and do not disintegrate. Thus, this process avoids any problem of dust formation during production of the cement clinker.

The clinker then is removed from the kiln and ground to a powder. The clinker can be ground with a quantity of gypsum. The gypsum is added to control the setting time of the cement. Normally, the gypsum can be present in an amount of from about 4 percent to about 6 percent of the hydraulic cement, by weight. At least a portion of the sulfur which is contained in the mineral containing residue is incorporated into the clinker by the firing procedure and it can be expected to supplement a portion of the gypsum that would be added to the cement.

To further illustrate the present invention and not by way of limitation, the follow example is provided.

EXAMPLE

A 100 pound sample of mineral-containing residue from a coal liquefaction process having the analysis set forth in Table III, below, is admixed with 400 pounds of finely ground limestone and 100 pounds of sand.

TABLE III

| Proximate Analysis | |
|---|---|
| Volatiles | 13.6% |
| Fixed Carbon | 43.5% |
| Mineral Matter | 42.0% |
| Mineral Matter Analysis | |
| $SiO_2$ | 39.0% |
| $Al_2O_3$ | 11.0% |
| $Fe_2O_3$ | 42.0% |
| CaO | 2.5% |

The mixture then is compacted to form pellets. The pellets are charged to a vertical shaft furnace. The charge is ignited from below and combustion air also is introduced to facilitate the firing. Following combustion, the clinker pellets so formed are found and a portion of the mixture is admixed with water. The mixture sets and slowly hardens into a hydraulic cement having the physical properties of portland cement.

While the present invention has been described with respect to what is at present considered to be the preferred embodiment, it is to be understood that changes or modifications can be made therein without departing from the spirit or scope of the invention as set forth in the following claims.

What is claimed is:

1. A process for utilizing mineral-containing residue from a coal liquefaction process comprising:

admixing said residue with siliceous and calcareous materials in a predetermined ratio to form a mixture capable of being converted into a hydraulic cement of a selected final composition;

compacting said mixture to form aggregates, said aggregates being formed without addition of a binding agent to said mixture;

introducing said aggregates into a kiln;

heating said kiln to effect conversion of said aggregates into a hydraulic cement clinker without substantial disintegration of said aggregates, said residue in said aggregates substantially providing all of the heat for said conversion by combustion of carbonaceous material contained in said residue;

removing said clinker from said kiln; and grinding said clinker to provide a hydraulic cement of said selected final composition.

2. The process of claim 1 wherein the clinker is formed without disintegration of said aggregates during conversion.

3. The process of claim 1 wherein a retarding agent is added to the ground hydraulic cement to control the setting time.

4. The process of claim 3 wherein the retarding agent is gypsum.

5. The process of claim 1 defined further as:

heating the aggregates within the kiln to a temperature in the range of from about 2600 degrees F. to about 2750 degrees F. to effect the conversion of said aggregates to clinker.

6. The process of claim 1 wherein the residue is admixed with said siliceous and calcareous material to provide a composition equivalent to a portland cement.

7. The process of claim 1 wherein the kiln comprises a vertical shaft kiln.

* * * * *